United States Patent
Arthur et al.

(10) Patent No.: US 8,840,404 B2
(45) Date of Patent: Sep. 23, 2014

(54) RIB CAGE ASSEMBLY FOR CRASH TEST DUMMY

(75) Inventors: John A. Arthur, Milan, OH (US); Paul J. Depinet, Norwalk, OH (US); Zhenwon J. Wang, Northville, MI (US); Cheng Yao, Fairfax, VA (US); John D. Below, Marblehead, OH (US); Michael S. Beebe, Norwalk, OH (US); Eric Jacuzzi, Plymouth, MI (US)

(73) Assignee: Humanetics Innovative Solutions, Inc., Plymouth, MI (US)

( * ) Notice: Subject to any disclaimer, the term of this patent is extended or adjusted under 35 U.S.C. 154(b) by 209 days.

(21) Appl. No.: 13/337,192

(22) Filed: Dec. 26, 2011

(65) Prior Publication Data

US 2013/0000426 A1  Jan. 3, 2013

Related U.S. Application Data

(60) Provisional application No. 61/428,559, filed on Dec. 30, 2010.

(51) Int. Cl.
  *G09B 23/28*   (2006.01)
(52) U.S. Cl.
  CPC ..................................... *G09B 23/28* (2013.01)
  USPC .......................................................... 434/274
(58) Field of Classification Search
  USPC .................. 434/262, 267, 274; 72/172, 866.4
  See application file for complete search history.

(56) References Cited

U.S. PATENT DOCUMENTS

| | | | |
|---|---|---|---|
| 3,664,038 A * | 5/1972 | Searle et al. | 434/274 |
| 3,753,302 A | 8/1973 | Daniel | |
| 4,261,113 A | 4/1981 | Alderson | |
| 4,701,132 A | 10/1987 | Groesch et al. | |
| 5,018,977 A * | 5/1991 | Wiley et al. | 434/274 |
| 5,317,931 A | 6/1994 | Kalami | |
| 6,206,703 B1 * | 3/2001 | O'Bannon | 434/274 |
| 6,439,070 B1 * | 8/2002 | Beebe et al. | 73/866.4 |
| 6,982,409 B2 | 1/2006 | Huang et al. | |
| 7,086,273 B2 | 8/2006 | Lipmyer | |
| 7,508,530 B1 | 3/2009 | Handman | |
| RE42,418 E | 6/2011 | Lipmyer | |
| 8,454,368 B2 * | 6/2013 | Ault et al. | 434/267 |
| 8,500,452 B2 * | 8/2013 | Trotta et al. | 434/268 |
| 2007/0058163 A1 | 3/2007 | Handman | |

* cited by examiner

*Primary Examiner* — Kurt Fernstrom
(74) *Attorney, Agent, or Firm* — Howard & Howard Attorneys PLLC

(57) ABSTRACT

A rib cage assembly for a crash test dummy includes a rib cage member made of a plastic material.

10 Claims, 5 Drawing Sheets

RIB CAGE ASSEMBLY FOR CRASH TEST DUMMY

CROSS-REFERENCE TO RELATED APPLICATION(S)

The present application claims the priority date of U.S. Provisional Patent Application Ser. No. 61/428,559, filed Dec. 30, 2010.

BACKGROUND OF THE INVENTION

1. Field of the Invention

The present invention relates generally to crash test dummies and, more particularly, to a rib cage assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic mannequins, better known as "crash test dummies." During collision testing, an operator places a crash test dummy inside a vehicle, and the vehicle undergoes a simulated collision. The collision exposes the crash test dummy to high inertial loading, and sensors inside the crash test dummy, such as accelerometers, pressure gauges, and the like, generate electrical signals of data corresponding to the loading. Cables transmit these electrical signals of data to a data acquisition system (DAS) for subsequent processing. This data reveals information about the effects of the collision on the crash test dummy and can be correlated to the effects a similar collision would have on a human occupant.

SUMMARY OF THE INVENTION

Accordingly, the present invention is a rib cage assembly for a crash test dummy. The rib cage assembly includes a rib cage member and an insert member cooperating with the rib cage member. The rib cage member is made of a plastic material and the insert member is made of a metal material.

Additionally, the present invention is a rib cage assembly for a crash test dummy. The rib cage assembly includes a rib cage member being made of a thermoset plastic material.

Further, the present invention is a rib cage assembly for a crash test dummy comprising a rib cage member being made of a thermoset plastic material. The thermoset plastic material is a blend of two or all of the prepolymers Adiprene® LF 750 D, Adiprene® LF 650 D, and Adiprene® LF 950 A.

In addition, the present invention is a crash test dummy comprising a body and a rib cage assembly operatively attached to the body. The rib cage assembly comprises a rib cage member and an insert member cooperating with the rib cage member, wherein the rib cage member is made of a plastic material and the insert member is made of a metal material.

Further, the present invention is a crash test dummy comprising a body and a rib cage assembly operatively attached to the body. The rib cage assembly comprises a rib cage member being made of a thermoset plastic material.

Still further the present invention is a crash test dummy comprising a body and a rib cage assembly operatively attached to the body. The rib cage assembly comprises a rib cage member being made of a thermoset plastic material, said thermoset plastic material being a blend of two or all of the prepolymers Adiprene® LF 750 D, Adiprene® LF 650 D, and Adiprene® LF 950 A.

One advantage of the present invention is that a new rib cage assembly and pelvis assembly are provided for a crash test dummy. Another advantage of the present invention is that the rib cage assembly includes a rib cage member being made of a plastic material. Yet another advantage of the present invention is that the rig cage assembly may include a metal insert sandwiched with plastic material. Still another advantage of the present invention is that the rib cage assembly may include a metal insert formed to the shape of the rib cage and sandwiched or buried inside the plastic rib cage. A further another advantage of the present invention is that the rib cage assembly includes a metal insert that provides additional strength to the rib cage, which allows softening the plastic material property, therefore improving the durability dummy rib cage. Yet a further advantage of the present invention is that the rib cage assembly includes a plastic rib cage and may include a metal insert in which the thickness of the metal insert and material stiffness of the plastic rib cage that can both be adjusted to come up with a predetermined stiffness and damping ratio to match human ribcage performance criteria. Still a further advantage of the present invention is that the rib cage assembly has endured over 120 tests without damage under test conditions that exceed well above the injury criteria for a three-year-old child side impact dummy. Another advantage of the present invention is that the rib cage assembly serves as a new tool for automotive crash impact development. Yet another advantage of the present invention is that the pelvis assembly includes a pair of pelvic bone members made of a thermoset plastic material. Still another advantage of the present invention is that the rib cage assembly and pelvis assembly includes a new thermoset plastic material that provides excellent strength, flexibility, and durability to simulate human pelvis bone and ribcage. A further advantage of the present invention is that the rib cage assembly includes the new thermoset plastic material and has endured over 300 compression tests without damage under test conditions that exceed well above the injury criteria for a three-year-old child side impact dummy.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
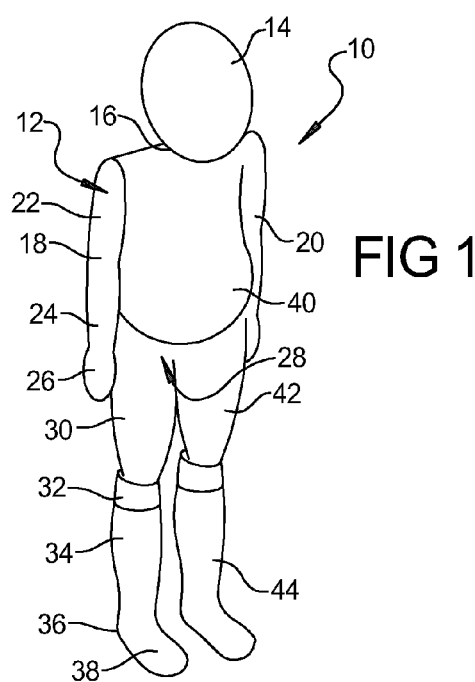
FIG. 1 is a perspective view of one embodiment of a rib cage assembly and a pelvis assembly, according to the present invention, illustrated in operational relationship with a crash test dummy.
Figure 2:
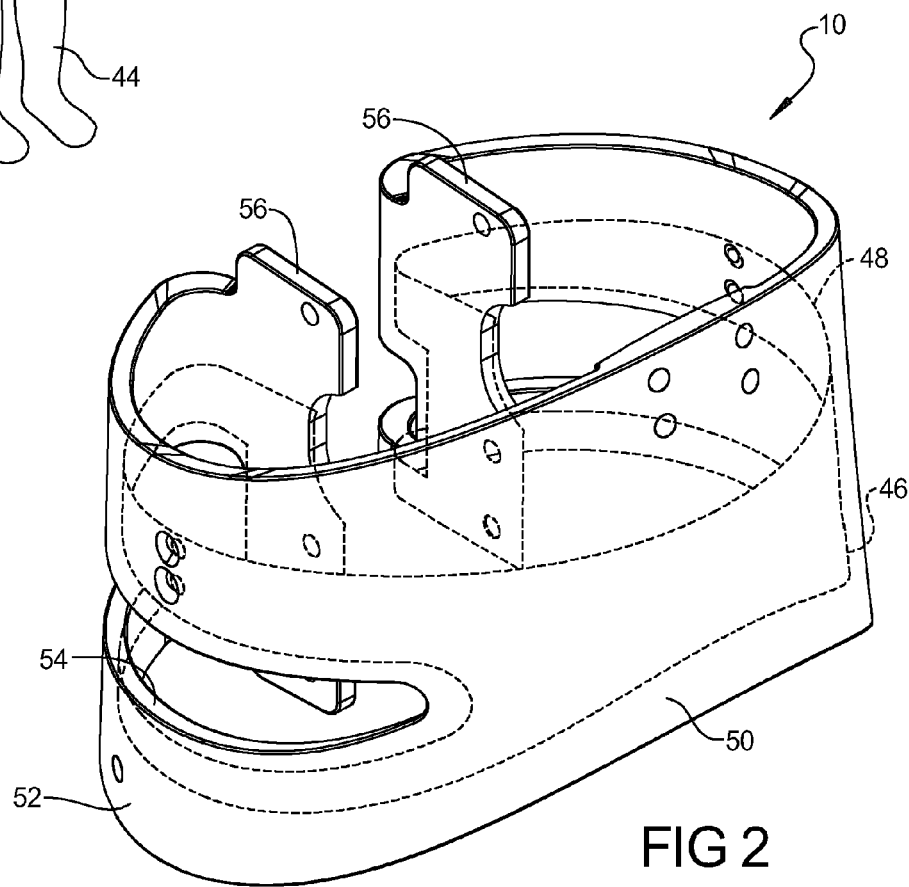
FIG. 2 is an enlarged perspective view of the rib cage assembly of FIG. 1.

Referring to the drawings and in particular FIGS. 1 and 2, one embodiment of a rib cage assembly 10, according to the present invention, is shown in operational relationship with a crash test dummy, generally indicated at 12. The crash test dummy 12 is of a three-year-old child side impact dummy and is illustrated in a standing position. This crash test dummy 12 is used primarily to test the performance of automotive interiors and restraint systems for small children front and rear seat occupants. The size and weight of the crash test dummy 12 are based on anthropometric studies by the Human Biomechanics and Simulation Standards Committee Task Force of the Society of Automotive Engineers. It should be appreciated that ranges of motions, centers of gravity, and segment masses simulate those of human subjects defined by the anthropometric data.

The crash test dummy 12 has a head assembly 14, which is shown in cross-section and includes a plastic skull (not shown) and skullcap (not shown) both covered by a vinyl skin. The skull cap is removable for access to head instrumentation (not shown) contained inside the head assembly 14. The head assembly 14 is mounted at the top end of a neck assembly 16 by a nodding block (not shown) and a nodding joint (not shown). A lower end of the neck assembly 16 extends into a torso area of the crash test dummy 12 and is connected to an upper end of a thoracic spine (not shown) by an upper neck bracket (not shown) connected to a lower neck bracket (not shown). The torso area of the crash test dummy 12 includes the rib cage assembly 10 having an upper end connected to the upper neck bracket and a lower end connected to a sternum assembly (not shown). It should be appreciated that the lower end of the spine is connected to a spine mounting weldment (not shown) by an adapter assembly (not shown).

The crash test dummy 12 also has a pair of arm assemblies including a right arm assembly 18 and a left arm assembly 20, which are attached to the crash test dummy 12. The left arm assembly 20 includes a clavicle link (not shown), which connects a clavicle (not shown) to the top of the thoracic spine. The clavicle is connected to a shoulder yoke (not shown), which in turn is connected to an upper end of an upper arm assembly 22. A lower end of the upper arm assembly 22 is connected to an upper end of a lower arm assembly 24. A lower end of the lower arm assembly 24 is connected to a hand assembly 26. It should be appreciated that the right arm assembly 18 is constructed in a similar manner.

As illustrated in the FIG. 1, a lower end of the lumbar spine is connected to a lumbar-thoracic adapter (not shown), which is connected to a lumbar to pelvic adapter (not shown). One embodiment of a pelvis assembly 28, according to the present invention, is shown connected to the adapter. A femur assembly 30 for a left leg has one end connected to the pelvis assembly 28. An opposite end of the femur assembly 30 is connected to a thigh bone (not shown) having an opposite end connected to a sliding knee assembly 32. One end of a tibia assembly 34 is connected to the knee assembly 32 and an opposite end is connected to an ankle assembly 36. The ankle assembly 36 is connected to a foot assembly 38. It should be appreciated that, although only the left leg is described, the right leg is similar in construction.

The various components of the crash test dummy 12 are covered in a vinyl skin such as the chest flesh and skin assembly 40, which extends from the lower end of the neck assembly 16 to a central portion of the lumbar spine. A lower end of the chest flesh and skin assembly 40 partially covers an upper portion of an abdominal insert (not shown) positioned in the lower torso. A lower portion of the abdominal insert is covered by an upper portion of the pelvis assembly 28. A thigh flesh and skin 42 covers the thigh bone 36 and a lower leg flesh/skin 44 covers the portion of the leg between the knee and the foot. It should be appreciated that a lifting ring (not shown) may be attached to the head assembly 14 for lifting the crash test dummy 12 into and out of test fixtures and vehicles.

Figure 3:
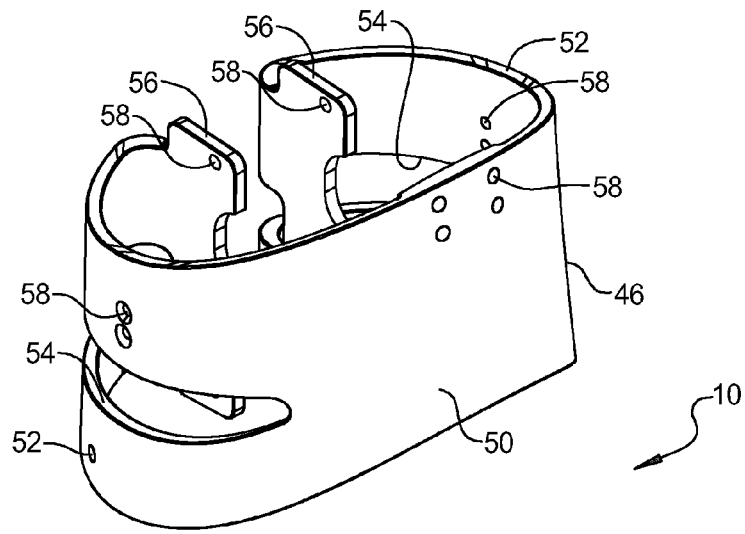
FIG. 3 is an exploded view of the rib cage assembly of FIG. 2.
Figure 3:
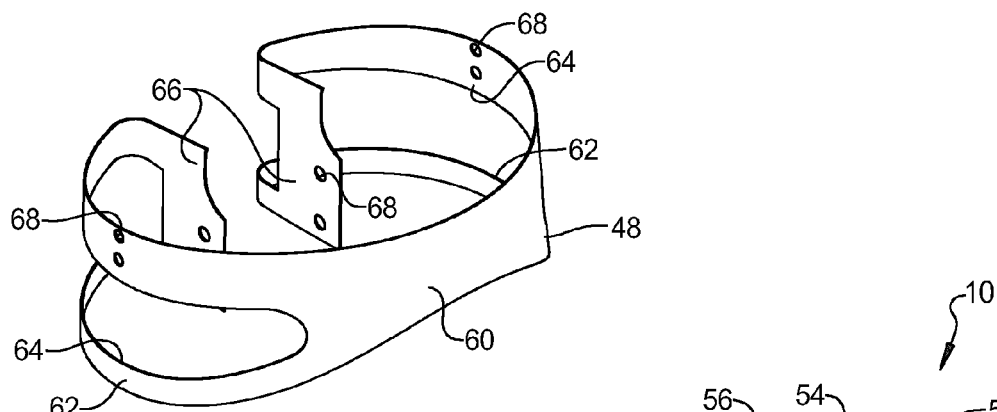

Referring to FIGS. 2 and 3, the rib cage assembly includes a rib cage member 46 and an insert member 48 cooperating with the rib cage member 46. The rib cage member 46 has a general "C" shape. The rib cage member 46 has a front portion 50 and side portions 52 extending therefrom with a slot 54 extending therethrough. The rib cage member 46 has a flange portion 56 extending inwardly from one end of each side portion 52. The front portion 50, side portions 52, and flange portions 56 include at least one, preferably a plurality of apertures 58 to allow fasteners (not shown) to extend therethrough for connection of the rib cage assembly 10 to the crash test dummy 12. The rib cage member 46 is made of a plastic material such as a thermoplastic material such as polyethylene or a thermoset plastic material such as a blend of two or all of the prepolymers Adiprene® LF 750 D, Adiprene® LF 650 D, and Adiprene® LF 950 A, which are commercially available from Chemtura Corporation. It should be appreciated that the blend is cured with commercially available MOCA curative. It should also be appreciated that the blend is adjusted to achieve the specific static and dynamic properties required for a particular application.

The insert member 48 is encapsulated within or sandwiched between or buried inside the rib cage member 46. The insert member 48 is made of a metal material. The insert member 48 is formed from a sheet of metal material. The insert member 48 is made of a super elastic material such as Nitinol. The insert member 48 is formed to the shape of the rib cage member 46 and is encapsulated within or sandwiched between or buried inside the rib cage member 46. The thickness of the insert member 48 and material stiffness of the rib cage member 46 can both be adjusted to come up with a predetermined stiffness and damping ratio to match human ribcage performance criteria. The insert member 48 has a general "C" shape. The insert member 48 has a front portion 60 and side portions 62 extending therefrom with a slot 64 extending therethrough. The insert member 48 has a flange portion 66 extending inwardly from one end of each side portion 62. The side portions 62 and flange portions 66 include at least one, preferably a plurality of apertures 68 to allow fasteners (not shown) to extend therethrough for connection of the rib cage assembly 10 to the crash test dummy 12. It should be appreciated that the insert member 48 provides additional strength to the rib cage member 46, which allows softening the plastic material property, therefore improving the durability of the rib cage assembly 10.

Figure 4:
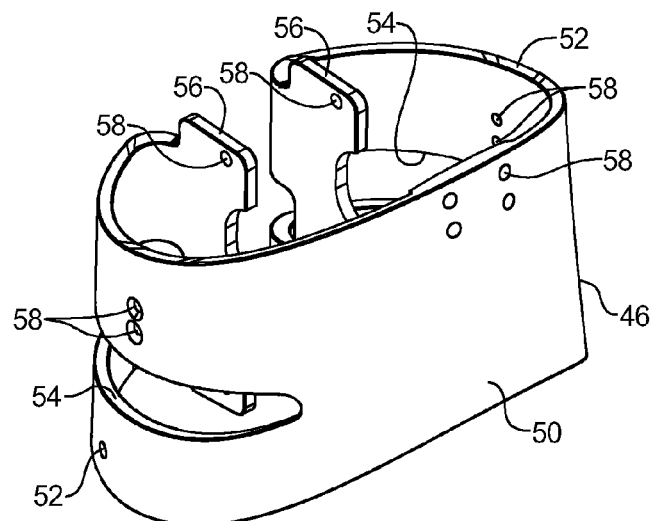
FIG. 4 is an enlarged perspective view of another embodiment, according to the present invention, of the rib cage assembly of FIG. 1.
Figure 5:
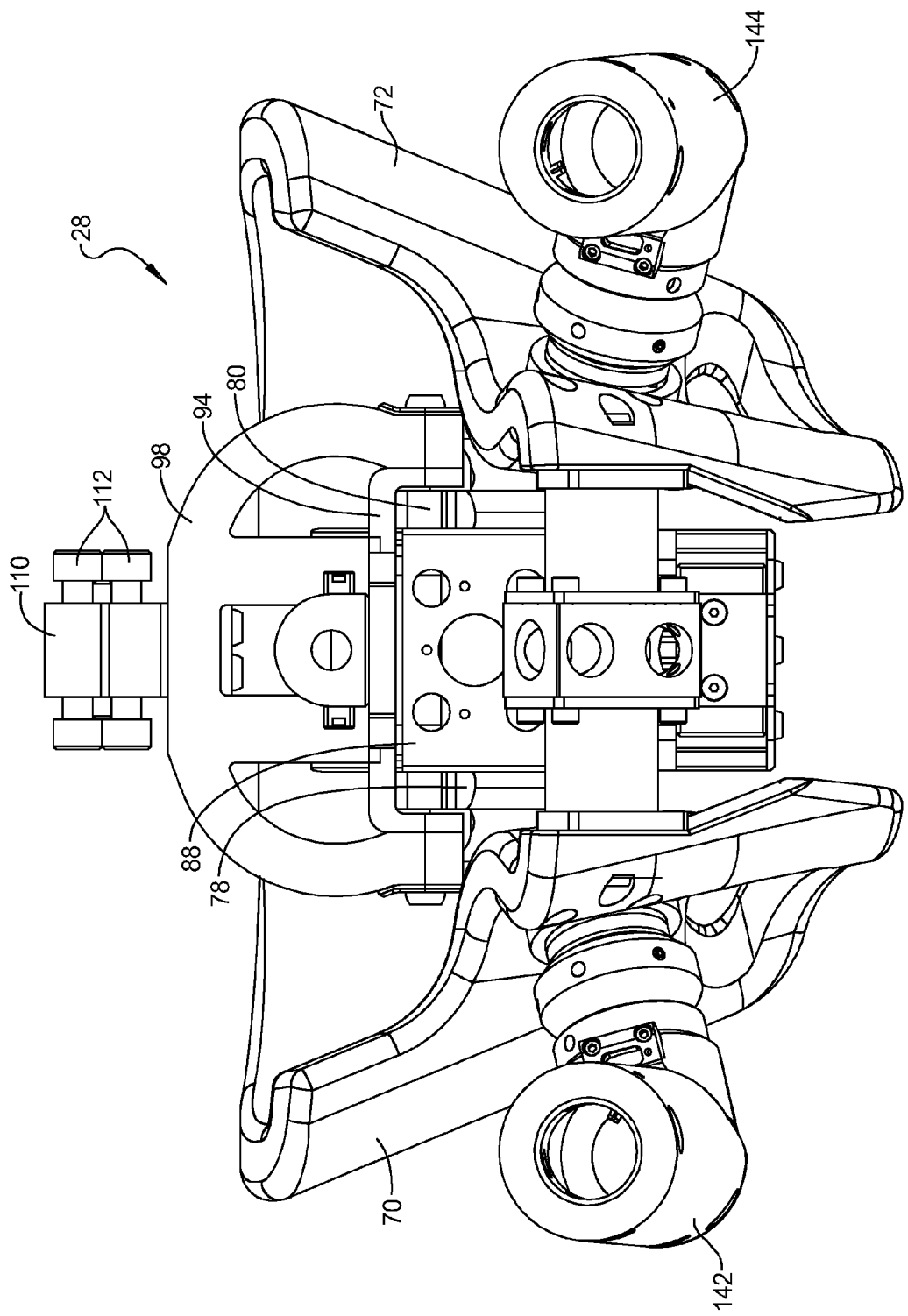
FIG. 5 is an enlarged front view of the pelvis assembly of FIG. 1.
Figure 6:
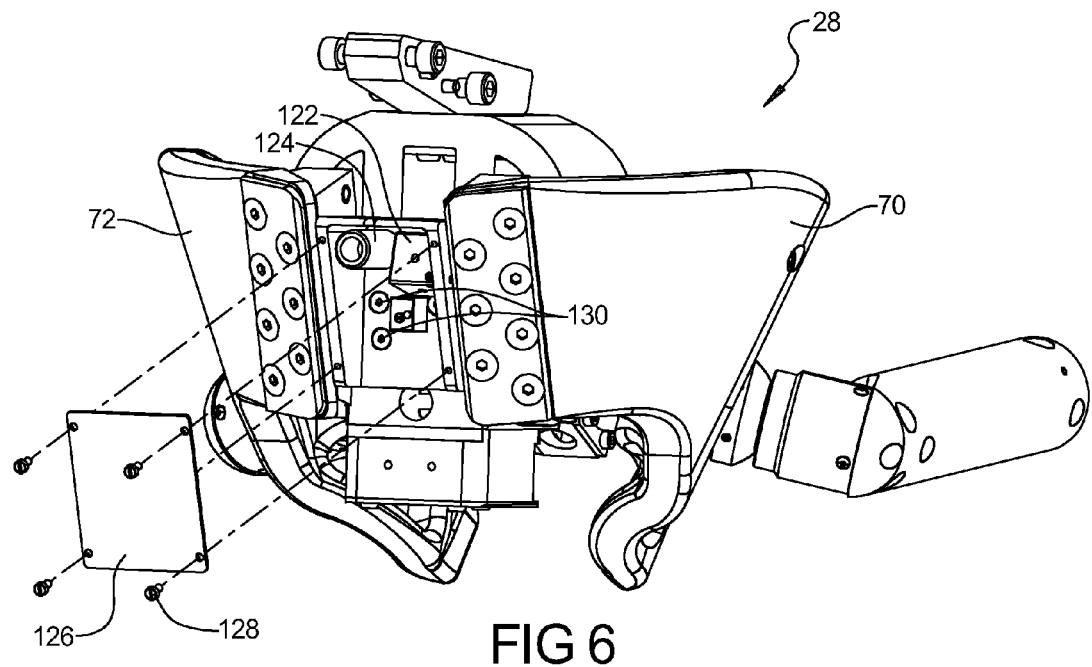
FIG. 6 is a side view of the pelvis assembly of FIG. 5.
Figure 8:
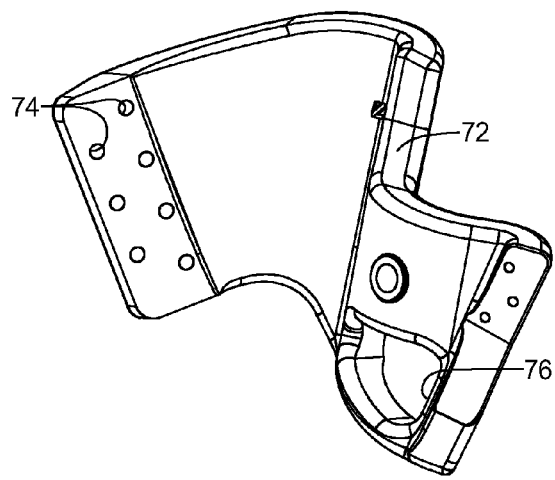
FIG. 8 is a left side view of a pelvic bone member of the pelvis assembly of FIG. 5.
Figure 7:
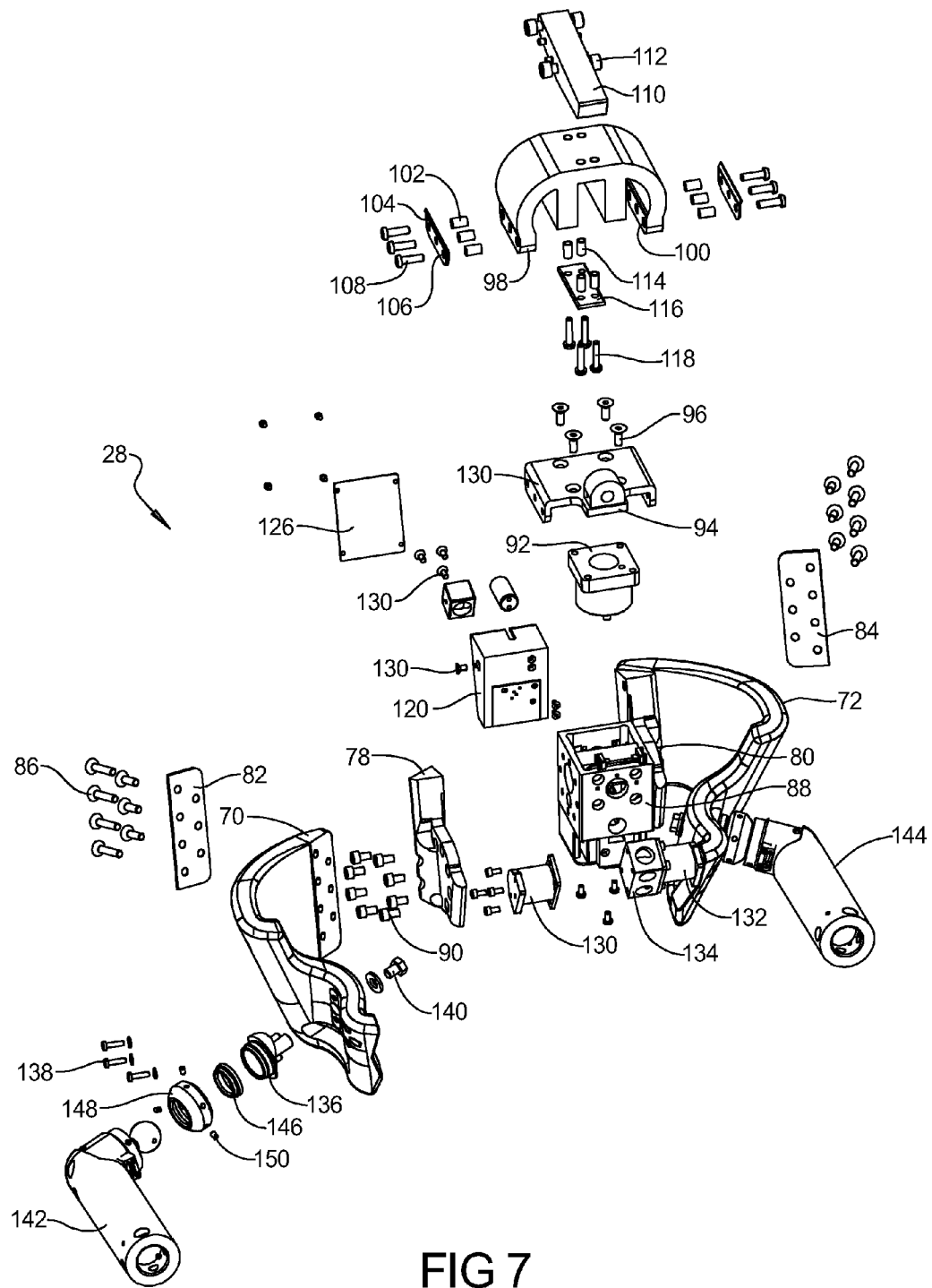
FIG. 7 is an exploded view of the pelvis assembly of FIG. 5.

Referring to FIG. 4, another embodiment, according to the present invention, of the rib cage assembly 10 is shown for the crash test dummy 12. Like parts of the rib cage assembly 10 have like numerals. In this embodiment, the rib cage assembly 10 includes the rib cage member 46, but eliminates the insert member 48. The rib cage member 46 has a general "C" shape. The rib cage member 46 has a front portion and side portions 52 extending therefrom with a slot 54 extending therethrough. The rib cage member 46 has a flange portion 56 extending inwardly from one end of each side portion 52. The front portion 50, side portions 52, and flange portions 56 include at least one, preferably a plurality of apertures 58 to allow fasteners (not shown) to extend therethrough for connection of the rib cage assembly 10 to the crash test dummy 12. The rib cage member 46 is made of a plastic material such as a thermoset plastic material. The thermoset plastic material is a blend of two or all of the prepolymers Adiprene® LF 750 D, Adiprene® LF 650 D, and Adiprene® LF 950 A, which are commercially available from Chemtura Corporation. It should be appreciated that the blend is cured with commercially available MOCA curative. It should also be appreciated that the blend is adjusted to achieve the specific static and dynamic properties required for a particular application.

Referring to FIGS. 1 and 5 through 8, one embodiment of the pelvis assembly 28, according to the present invention, is shown in operational relationship with the crash test dummy 12. The pelvis assembly 28 includes a pair of pelvic bone members, preferably a right pelvic bone member 70 and a left pelvic bone member 72. The pelvic bone members 70,72 are made of a plastic material such as a thermoset plastic material. The thermoset plastic material is a blend of two or all of the prepolymers Adiprene® LF 750 D, Adiprene® LF 650 D, and Adiprene® LF 950 A, which are commercially available from Chemtura Corporation. It should be appreciated that the blend is cured with commercially available MOCA curative. It should also be appreciated that the blend is adjusted to achieve the specific static and dynamic properties required for a particular application. It should further be appreciated that, as illustrated, the pelvic bone members 70, 72 may include a plurality of apertures 74 to allow fasteners to extend through and a plurality of aperture 76 to allow members to extend through.

The pelvis assembly 28 also includes a pair of interface brackets, preferably a right interface bracket 78 disposed adjacent one side of the right pelvic bone member 70 and a left interface bracket 80 disposed adjacent one side of the left pelvic bone member 72. The interface brackets 78,80 are made of a metal material.

The pelvis assembly 28 includes a pair of clamp plates, preferably a right clamp plate 82 disposed adjacent another side of the right pelvic bone member 70 and a left clamp plate 84 disposed adjacent another side of the left pelvic bone member 72. The clamp plates 82,84 are made of a metal material. The pelvis assembly 28 also includes at least one, preferably a plurality of fasteners 86 such as screws to secure the clamp plates 82,84, pelvic bone members 70,72, and interface brackets 78,80 together.

The pelvis assembly 28 further includes a structural replacement 88 for a sacro-iliac load cell. The pelvis assembly 28 includes a plurality of fasteners 90 such as screws to secure the interface brackets 78,80 to the structural replacement 88. The pelvis assembly 28 also includes a structural replacement 92 for a lumbar spine load cell. The pelvis assembly 28 includes a lower lumbar mounting bracket 94 and a plurality of fasteners 96 such as screws to secure the mounting bracket 94 to the structural replacement 88.

The pelvis assembly 28 also includes a lumbar spine member 98 attached to the lower lumbar mounting bracket 94. The lumbar spine member 98 has a plurality of apertures 100 extending therethrough on each side thereof. The lumbar spine member 98 is made of an elastomeric material. The pelvis assembly 28 includes a plurality of lumbar bushings 102 disposed in the apertures 100 and a lower lumbar clamping plate 104 disposed on each side of the lumbar spine member 94. The lower lumbar clamping plate 104 has a plurality of apertures 106 extending therethrough. The pelvis assembly 28 also includes a plurality of fasteners 108 such as screws extending through the apertures 106 in the clamping plates 104, lumbar bushings 102, and lumbar spine member 98 to threadably engage the apertures in the lower lumbar mounting bracket 94 to secure the lumbar spine member 98 to the lower lumbar mounting bracket 94.

The pelvis assembly 28 also includes a lumbar mounting wedge 110 attached to an upper surface of the lumbar spine member 98 and a plurality of fasteners 112 such as screws attached to the lumbar mounting wedge 110. The pelvis assembly 28 further includes a plurality of lumbar bushings 114 disposed in apertures in a top portion of the lumbar spine member 98 and an upper lumbar clamping plate 116 disposed on a bottom side of the lumbar spine member 98. The upper lumbar clamping plate 116 has a plurality of apertures extending therethrough. The pelvis assembly 28 includes a plurality of fasteners 118 such as screws extending through the apertures in the upper lumbar clamping plate 116, lumbar bushings 114, and lumbar spine member 98 to threadably engage the apertures in the lumbar mounting wedge 110 to secure the lumbar mounting wedge 110 to the lower spine member 98.

The pelvis assembly 28 also includes an instrumentation bracket 120 attached to the structural replacement 88. The pelvis assembly 28 includes a structural replacement 122 for a tilt sensor and a rotational accelerometer replacement 124 both attached to the structural replacement 88. The pelvis assembly 28 also includes an instrumentation cover 126 and a plurality of fasteners 128 such as screws to attach the instrumentation cover 126 to the structural replacement 88. It should be appreciated that the pelvis assembly 28 includes various fasteners 130 such as screws for fastening purposes.

The pelvis assembly 28 includes a pubic buffer 132 extending through an aperture in the pelvic bone members 70,72. The pelvis assembly 28 also includes a structural replacement 134 for a pubic load cell attached to the pubic buffer 132. The pelvis assembly 28 includes a hip joint socket assembly 136 attached to the pelvic bone members 70,72 and a flat washer 138 and fastener 140 such as a screw to attach the hip joint socket assembly 136 to the pelvic bone members 70,72.

The pelvis assembly 28 further includes a pair of femur assemblies, preferably a right femur assembly 142 attached to the right hip joint socket assembly 136 and a left femur assembly 144 attached to the left hip joint socket assembly 136. The pelvis assembly 28 includes an inner ring hip joint 146 and a hip socket retainer 148 connected to each femur assembly 142,144 and hip joint socket assembly 136. The pelvis assembly includes a plurality of fasteners 150 such as screws to attach each femur assembly 142,244 to the hip joint socket assembly 136. It should be appreciated that, except for the pelvic bone members 70,72, the other members of the pelvis assembly 28 are conventional and known in the art.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A rib cage assembly for a crash test dummy comprising:
   a rib cage member;
   an insert member encapsulated within said rib cage member; and
   wherein said rib cage member is made of a plastic material and said insert member is made of a metal material.

2. A rib cage assembly as set forth in claim 1 wherein said insert member is a sheet of material.

3. A rib cage assembly as set forth in claim 1 wherein said metal material is Nitional.

4. A rib cage assembly as set forth in claim 1 wherein said insert member is generally "C" shaped.

5. A rib cage assembly as set forth in claim 1 wherein said rib cage member and said insert member have a predetermined stiffness and damping ratio to match human ribcage performance criteria.

6. A crash test dummy comprising:
a body;
a rib cage assembly operatively attached to said body; and
said rib cage assembly comprising a rib cage member and an insert member encapsulated within said rib cage member, wherein said rib cage member is made of a plastic material and said insert member is made of a metal material.

7. A crash test dummy as set forth in claim 6 wherein said insert member is a sheet of material.

8. A crash test dummy as set forth in claim 6 wherein said metal material is Nitinol.

9. A crash test dummy as set forth in claim 6 wherein said insert member is generally "C" shaped.

10. A crash test dummy as set forth in claim 6 wherein said rib cage member and said insert member have a predetermined stiffness and damping ratio to match human ribcage performance criteria.

* * * * *